United States Patent Office 3,567,832
Patented Mar. 2, 1971

3,567,832
NEW HYPOTENSIVE AND ODDIAN SPASMOLYTIC PHARMACEUTICAL METHODS EMPLOYING VARIOUS HYDROXY COUMARINES
Eugène Boschetti, Venissieux, Darius Molho, Boulogne-sur-Seine, and Louis Fontaine, Lyon, France, assignors to LIPHA, Lyonnaise Industrielle Pharmaceutique
No Drawing. Filed Mar. 18, 1968, Ser. No. 714,043
Claims priority, application France, Nov. 20, 1967, 128,850
Int. Cl. A61k 27/00
U.S. Cl. 424—281  3 Claims

ABSTRACT OF THE DISCLOSURE

A new hypotensive and oddian spasmolytic pharmaceutical composition, containing as active principle a hydroxycoumarine selected from the group consisting of 8-hydroxycoumarine, 7,8 dihydroxycoumarine, 4,5,7-trihydroxycoumarine, 4,6,7-trihydroxycoumarine, 4,7,8-trihydroxycoumarine, 7-hydroxycoumarine, 3 - carboxy-7,8-dihydroxycoumarine, 3 - methyl - 4,7,8 - trihydroxycoumarine, 3-phenyl-4,5,7-trihydroxycoumarine, 3-chloro-4-methyl-7,8-dihydroxycoumarine, 3 - chloro-4-methyl-5,7-dihydroxycoumarine, 3-chloro-4-methyl - 6,7 - dihydroxycoumarine, 3-amino-7,8-dihydroxycoumarine.

---

The present invention relates to new medicines having hypotensive and spasmolytic properties, an containing, as active principle, a hydroxyl derivative of coumarine.

The choleretic activity of certain optionally substituted monohydroxyl and dihydroxyl coumarine compounds is known, and in particular forms the subject of the French special medicaments Patents Nos. 1,430 M of July 13, 1961 and 2,321 M of Jan. 16, 1962, in the name of the applicants.

Certain other compounds of these series, and particularly 4 - methyl - 7 - hydroxycoumarine or hymecromone, have shown a strong spasmolytic effect on the cholecyst and more particularly on the region of the sphincter of Oddi.

On the other hand, several hydroxy-cinnamic acids are known for their inhibiting action on the 3,4-dihydroxyphenylalanine (DOPA) decarboxylase, and one of them, known under the name Methyl DOPA, is used therapeutically in the treatment of hypertension. For these two reasons, it has seemed to be of interest to study the activity of hydroxycoumarines in these fields. A series of compounds which are already known per se has been found, but these compounds have so far not been used therapeutically and are formed by:

8-hydroxycoumarine,
7,8-dihydroxycoumarine,
4,5,7-trihydroxycoumarine,
4,6,7-trihydroxycoumarine,
4,7,8-trihydroxycoumarine,
7-hydroxycoumarine,
3-carboxy-7,8-dihydroxycoumarine,
3,-methyl-4,7,8-trihydroxycoumarine,
3-phenyl-4,5,7-trihydroxycoumarine,
3-chloro-4-methyl-7,8-dihydroxycoumarine,
3-chloro-4-methyl-5,7-dihydroxycoumarine,
3-chloro-4-methyl-6,7-dihydroxycoumarine,
3-amino-7,8-dihydroxycoumarine.

The new active principles come within the sphere of the formula:

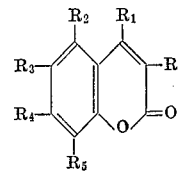

in which, according to the compounds; R is a hydrogen, alkyl, aryl, amino, carboxy radical or a halogen; $R_1$ is and alkyl, hydroxy radical or hydrogen; $R_2$, $R_3$, $R_4$, $R_5$ are hydrogen or a hydroxy radical.

These hydroxyl compounds can be used as medicines, either in the free state or in the form of their addition salts with the organic or mineral bases and, in the case of the compounds having a primary amine function, in the form of their addition salts with the organic or mineral acids.

These compounds, new in therapeutics, are prepared according to the following processes:

8-hydroxycoumarine: $C_9H_6O_3$

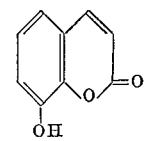

M.P.=156° C.

prepared according to B. B. Dey, Proc, Nath, Inst. Sci. India, 1940, 6, 641–669.

7,8-dihydroxycoumarine: $C_9H_6O_4$

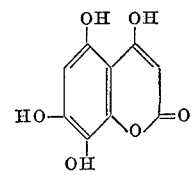

M.P.=261° C.

prepared according to P. Leone, Gazz. Chim. Ital., 1925, 55, 673.

4,5,7-trihydroxycoumarine: $C_9H_6O_5$

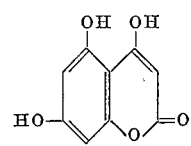

M.P.=326° C. with decomposition (sealed tube)

prepared according to Sonn, Berichte, 50, 1303.

4,6,7-trihydroxycoumarine: $C_9H_6O_5$

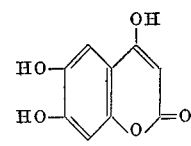

M.P.=325° C.

prepared according to Gaston Amiard, Bull. Soc. Chim. 1947, pages 512–513.

4,7,8-trihydroxycoumarine: $C_9H_6O_5$

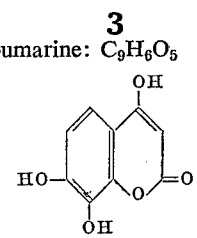
M.P.=258° C.

prepared according to N. J. Desai, J. Org. Chem. 22, 388–390, 1957.

7-hydroxycoumarine: $C_9H_6O_3$

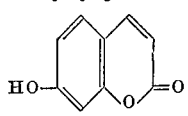
M.P.=215° C. (sealed tube)

prepared according to Pechmann, Berichte, 17, page 933.

3-carboxy-7,8-dihydroxycoumarine: $C_{10}H_6O_6$

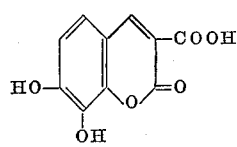
M.P.=272° C.

prepared according to Th. Boehm et Coll. Arch. Pharmaz., 1933, 271, 490.

3-methyl-4,7,8-trihydroxycoumarine: $C_{10}H_8O_5$

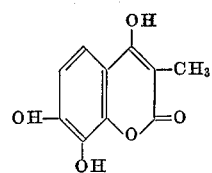
M.P.=245° C.

prepared according to K. Trivedi, J. Sci. Ind. Res., 21B, 402–3, 1962.

3-phenyl-4,5,7-trihydroxycoumarine: $C_{15}H_{10}O_5$

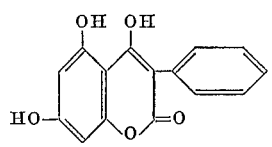
M.P.=278° C.

prepared according to A. G. Gilbert et Coll. J. Chem. Soc., 1957, pages 3740–5.

3-chloro-4-methyl-7,8-dihydrocoumarine: $C_{10}H_7ClO_4$

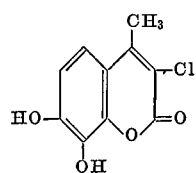
M.P.=265° C.

prepared according to Pechmann, Berichte, 34, 359.

3-chloro-4-methyl-5,7-dihydroxycoumarine: $C_{10}H_7ClO_4$

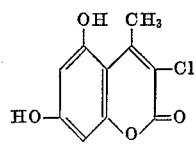
M.P.=306–308° C.

prepared according to Dey, Soc. 107, 1648.

3-chloro-4-methyl-6,7-dihydroxycoumarine: $C_{10}H_7ClO_4$

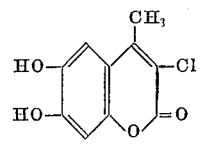
M.P.=259° C prepared according to Dey, Soc. 107, 1648.

3-amino-7,8-dihydroxycoumarine: $C_9H_7NO_4$

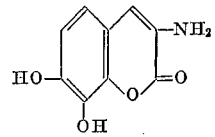
M.P.=264° C.

prepared according to G. Rodighiero, Boll. Chim. Farm., 97, 1958, page 599.

The oddian spasmolytic activity was determined on a guinea pig by the method described by Boissier and Chivot (Journal de Physiologie 51, 408, 1959), by intravenous administration in aqueous solution in the form of a sodium salt.

The standard chosen is hymecromone (4-methyl-7-hydroxycoumarine), to which was attributed the coefficient 100.

The activity coefficients are established by planimetry, so as to take into account the intensity and the duration of the spasmolytic response. Where this is possible, the product to be tested and the standard product were studied on the same animal.

The inhibiting activity of DOPA (3,4-dihydroxyphenylalanine) decarboxylase, was studied by the method of Sourkes, using the renal cortex of a guinea pig. The DOPA decarboxylase contained in this cortex, brought into the presence of a substrate which is DOPA, produces the Dopamine and $CO_2$; the manometric measurement in the Warburg apparatus of the release of $CO_2$ reflects the activity of the DOPA decarboxylase. If the substrate is mixed beforehand with an inhibitor of the DOPA decarboxylase, such as the methyl DOPA, which is the standard substance, the activity decreases and the release of $CO_2$ is less intense.

The results are expressed as a percentage of the activity of the methyl DOPA, to which has been attributed the coefficient 100.

In the following tables, there are given the coefficients of the compounds having simultaneously an inhibiting action of the DOPA decarboxylase (IDEC) and a spasmolytic activity (Table I), then the coefficients of the compounds having an inhibiting action of the DOPA decarboxylase, IDEC, alone (Table II), and finally those of the compounds having only an oddian spasmolytic activity (Table III).

TABLE I

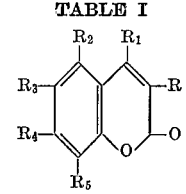

| Products | Coefficient of inhibiting activity of the DOPA decarboxylase | Coefficient of oddian spasmolytic activity |
|---|---|---|
| Methyldopa | 100 | |
| Hymecromone | | 100 |
| 7-hydroxycoumarine ($R_4$=OH; R=$R_1$=$R_2$=$R_3$=$R_5$=H) | 81 | 68 |
| 7,8-dihydroxycoumarine ($R_4$=$R_5$=OH; R=$R_1$=$R_2$=$R_3$=H) | 71 | 191 |
| 4,5,7-trihydroxycoumarine ($R_1$=$R_2$=$R_4$=OH; R=$R_3$=$R_5$=H) | 42 | 155 |
| 4,6,7-trihydroxycoumarine ($R_1$=$R_3$=$R_4$=OH; R=$R_2$=$R_5$=H) | 36 | 165 |
| 3-chloro-4-methyl-6,7-dihydroxycoumarine (R=Cl; $R_1$=$CH_3$; $R_3$=$R_4$=OH; $R_2$=$R_5$=H) | 40 | 149 |

TABLE II

| Products: | Coefficient of inhibiting activity of the DOPA decarboxylas: |
|---|---|
| Methyldopa | 100 |
| 3-amino-7, 8-dihydroxycoumarine ($R=NH_2$; $R_4=R_5=OH$; $R_1=R_2=R_3=H$) | 80 |
| 3-amino-6, 7-dihydroxycoumarine ($R=NH_2$; $R_3=R_4=OH$; $R_1=R_2=R_5=H$) | 39 |
| 3-chloro-4-methyl-5, 7-dihydroxycoumarine ($R=Cl$; $R_1=CH_3$; $R_2=R_4=OH$; $R_3=R_5=H$) | 38 |
| 3-chloro-4-methyl-7, 8-dihydroxycoumarine ($R=Cl$; $R_1=CH_3$; $R_4=R_5=OH$; $R_2=R_3=H$) | 41 |

TABLE III

| Products: | Coefficient of oddian spasmolytic activity |
|---|---|
| Hymecromone | 100 |
| 8-hydroxycoumarine ($R_5=OH$; $R=R_1=R_2=R_4=H$) | 148 |
| 3-carboxy-7,8-dihydroxycoumarine ($R=COOH$; $R_4=R_5=OH$; $R_1=R_2=R_3=H$) | 110 |
| 3-phenyl-4,5,7-trihydroxycoumarine ($R=C_6H_5$; $R_1=R_2=R_4=OH$; $R_3=R_5=H$) | 94 |
| 3-methyl-4,7,8-trihydroxycoumarine ($R=CH_3$; $R_1=R_4=R_5=OH$; $R_2=R_3=H$) | 191 |
| 4,7,8-trihydroxycoumarine ($R_1=R_4=R_5=OH$; $R=R_2=R_3=H$) | 152 |

The following clinical results, relating to the hypotensive activity of the compound in the formula, in which $R=NH_2$; $R_4=R_5=OH$; $R_1=R_2=R_3=H$, that is to say, the 3-amino-7,8-dihydroxycoumarine known under the name LM 364, show the interest of the new medicine. The tablets are titrated to 100 mg. of LM 364.

1st observation: Mrs. Anna L., 72 years old

Familiar with cerebral arterial hypertension and vascular incidents. A.H.T. of renal origin. Kidney mute with intravenous urography, I.V.U. with calcification of mastic kidney type.

Diffused arterial etheroscherosis with abolition of the pulse in the lower members, left aorto iliac aneurysm, cervical and sub-calvian murmur, vascular cerebral incident with completely regressed hemiplegia.

No enlarged heart. Electrocardiographic left ventricular hypotrophy (L.V.H.). Arterial tension (A.T.) at 21/13. Two tablets per day of LM 364 for 16 days plus saline diuretic plus salt-free diet.

Very clear hypertensive action, A.T. falls to 17/8. The A.T. quickly rises again to the earlier figures, despite continuing the saline diuretic and the salt-free diet, after stoppage of the product.

Excellent tolerance.

2nd observation: Mrs. Louise M., 71 years old

Moderate arterial hypertension of unspecified duration. Left hemiplegia in 1964.

High arterial tension at 21/10, electrocardiographic L.V.H. and permanent auricular fibrillation.

Discussion of a slight mitral endocarditis.

Two tablets per day for 8 days of LM 364 and one tablet per day for 9 days plus salt-free diet plus diuretic.

Rapid action of the LM 354. A.T., on completion of the cure, at 17/8.

This increase again to 19/9 as soon as the LM 364 is stopped, despite continuing the diuretic and salt-free diet. Excellent tolerance.

3rd observation: Mrs. Marie L., 81 years old

Left hemiphatic incident with illness in October 1966.
A.T. on admission: 21/12. No electrocardiograph L.V.H. Fundus oculi, discrete hypertensive retinitis with predominance of arterial atheroma. Discrete cardiacal insufficiency.

Two tablets per day of LM 364 for 5 days, and three tablets per day for 21 days plus salt-free diet plus saline diuretic.

Distinct therapeutic effect: A.T. falls to 18/9, rises again to 19/10 on stopping the LM 364.

Very positive action of the product. Excellent tolerance.

The pharmaceutical compositions, containing as active principle a hydroxycoumarine according to the present invention can be in the form of compressed pills, tablets, gelatine capsule, sugar-coated pills, aqueous suspensions, injectable solutions, syrups and the like.

A formula of a compressed pill is given below as a non-limiting example:

| | Mg. |
|---|---|
| Active principle | 100 |
| Lactose | 46 |
| Royalgine | 10 |
| Starch | 10 |
| Talcum | 20 |
| Potato starch | 10 |
| Magnesium stearate | 4 |

These pharmaceutical compositions, containing a hydroxycoumarine according to the invention as active principle and a solid or liquid pharmaceutical excipient, support or diluent which is physiologically acceptable, permit the daily administration of doses of active principle which are between approximately 50 mg. and 1000 mg.

What we claim is:

1. A method for treating hypertension and spasms of the oddi which comprises administering, in unit dosage form, a composition containing from about 50 to about 1000 mg. of a compound selected from the group consisting of 7-hydroxycoumarine; 7,8-dihydroxycoumarine; 4,5,7 - trihydroxycoumarine; 4,6,7-trihydroxycoumarine; and 3-chloro-4-methyl-6,7-dihydroxycoumarine, dispersed in a pharmaceutical carrier, to a subject suffering from hypertension and spasms of the oddi.

2. A method for treating hypertension which comprises administering, in unit dosage form, a composition containing from about 50 to about 1000 mg. of a compound selected from the group consisting of 3-amino-7,8-dihydroxycoumarine; 3-amino-6,7-dihydroxycoumarine; 3-chloro-4-methyl-5,7-dihydroxycoumarine; and 3-chloro-4-methyl-7,8-dihydroxycoumarine, dispersed in a pharmacuetical carrier, to a subject suffering from hypertension.

3. A method for treating spasms of the oddi which comprises administering, in unit dosage form, a composition containing from about 50 to about 1000 mg. of a compound selected from the group consisting of 8-hydroxycoumarine; 3-carboxy-7,8-dihydroxycoumarine; 3-phenyl - 4,5,7-trihydroxycoumarine; 3-methyl-4,7,8-trihydroxycoumarine; and 4,7,8-trihydroxycoumarine, dispersed in a pharmaceutical carrier, to a subject suffering from spasms of the oddi.

References Cited

FOREIGN PATENTS 2,321M   1/1962   France.

OTHER REFERENCES

C.A.(1), 52-2003f (1957).
C.A.(2), 51-14418e (1958).
C.A.(3), 54-8804i (1961).
C.A.(4), 66-102739c (1967).
C.A.(5), 60-5440h (1964).
C.A.(6), 60-9235h (1964).
C.A.(7), 53-9201c (1959).
C.A.(8), 53-14213d (1959).
C.A.(9), 53-10,515f (1959).

STANLEY J. FRIEDMAN, Primary Examiner